US012671751B2

(12) United States Patent
Andreani et al.

(10) Patent No.: US 12,671,751 B2
(45) Date of Patent: Jun. 30, 2026

(54) DATA PROTOCOL DETECTION AND SWITCHING OF MULTI-PROTOCOL DATA ON COMMON CONNECTORS

(71) Applicant: Lantronix, Inc., Irvine, CA (US)

(72) Inventors: Jean-Charles Andreani, Hong Kong (CN); Guido Voigt, Angelroda (DE); Jonathan Shipman, Irvine, CA (US)

(73) Assignee: Lantronix, Inc., Irvine, CA (US)

( * ) Notice: Subject to any disclaimer, the term of this patent is extended or adjusted under 35 U.S.C. 154(b) by 45 days.

(21) Appl. No.: 18/708,437

(22) PCT Filed: Nov. 16, 2022

(86) PCT No.: PCT/US2022/079955
§ 371 (c)(1),
(2) Date: May 8, 2024

(87) PCT Pub. No.: WO2023/091942
PCT Pub. Date: May 25, 2023

(65) Prior Publication Data
US 2025/0016251 A1     Jan. 9, 2025

Related U.S. Application Data

(60) Provisional application No. 63/279,899, filed on Nov. 16, 2021.

(51) Int. Cl.
*H04L 69/08* (2022.01)
(52) U.S. Cl.
CPC .................................... *H04L 69/08* (2013.01)

(58) Field of Classification Search
CPC ............................ H04L 69/08; G06F 13/4265
See application file for complete search history.

(56) References Cited

U.S. PATENT DOCUMENTS

| | | | | |
|---|---|---|---|---|
| 7,018,242 B2 * | 3/2006 | Brown | .................. | H01R 31/06 |
| | | | | 439/676 |
| 10,339,093 B2 * | 7/2019 | Srivastava | ............ | G06F 13/385 |
| 2004/0066790 A1 * | 4/2004 | Valavi | ..................... | H04L 69/18 |
| | | | | 370/465 |
| 2005/0021890 A1 * | 1/2005 | Baker | ..................... | H04L 69/18 |
| | | | | 710/62 |

(Continued)

*Primary Examiner* — Jerry B Dennison
(74) *Attorney, Agent, or Firm* — Haynes and Boone, LLP

(57) ABSTRACT

Connectors as essential components for transmitting data in communication networks come in different types. Utilizing a common connector capable of transmitting different types of data protocols can save space and energy. A device utilizes a common connector and a detector that detects the data protocol and transmits the data over a proper data path. Thus, smaller devices can be deployed by substituting different connectors by a single common connector. Data which is transmitted from the common connector is passed through a detector logic which detects a protocol associated with the data. The detected protocol is used to determine which data path is a proper data path to transmit the data. Depending on the number of pins of the common connector and the native connector of the receiving device, several methods are used to transmit the data, which ensure the entire data is transmitted via the proper data path.

20 Claims, 4 Drawing Sheets

(56)           References Cited

U.S. PATENT DOCUMENTS

| | | | |
|---|---|---|---|
| 2006/0129702 A1* | 6/2006 | Koertel | G06F 13/4068 |
| | | | 710/14 |
| 2012/0120955 A1* | 5/2012 | Vissers | H04L 12/4633 |
| | | | 370/392 |
| 2013/0227185 A1* | 8/2013 | Cooklis | G06F 13/4072 |
| | | | 710/106 |
| 2025/0016251 A1* | 1/2025 | Andreani | H04L 69/08 |
| 2025/0315328 A1* | 10/2025 | Dutta | G06F 11/0757 |

* cited by examiner

*FIG. 2*
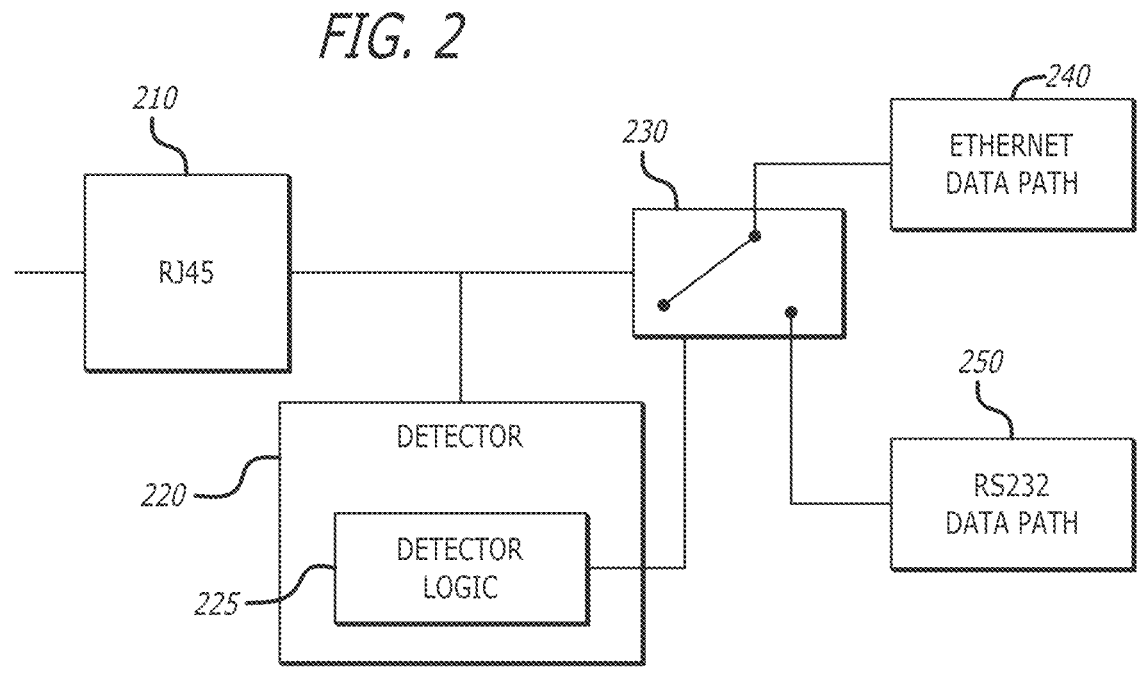
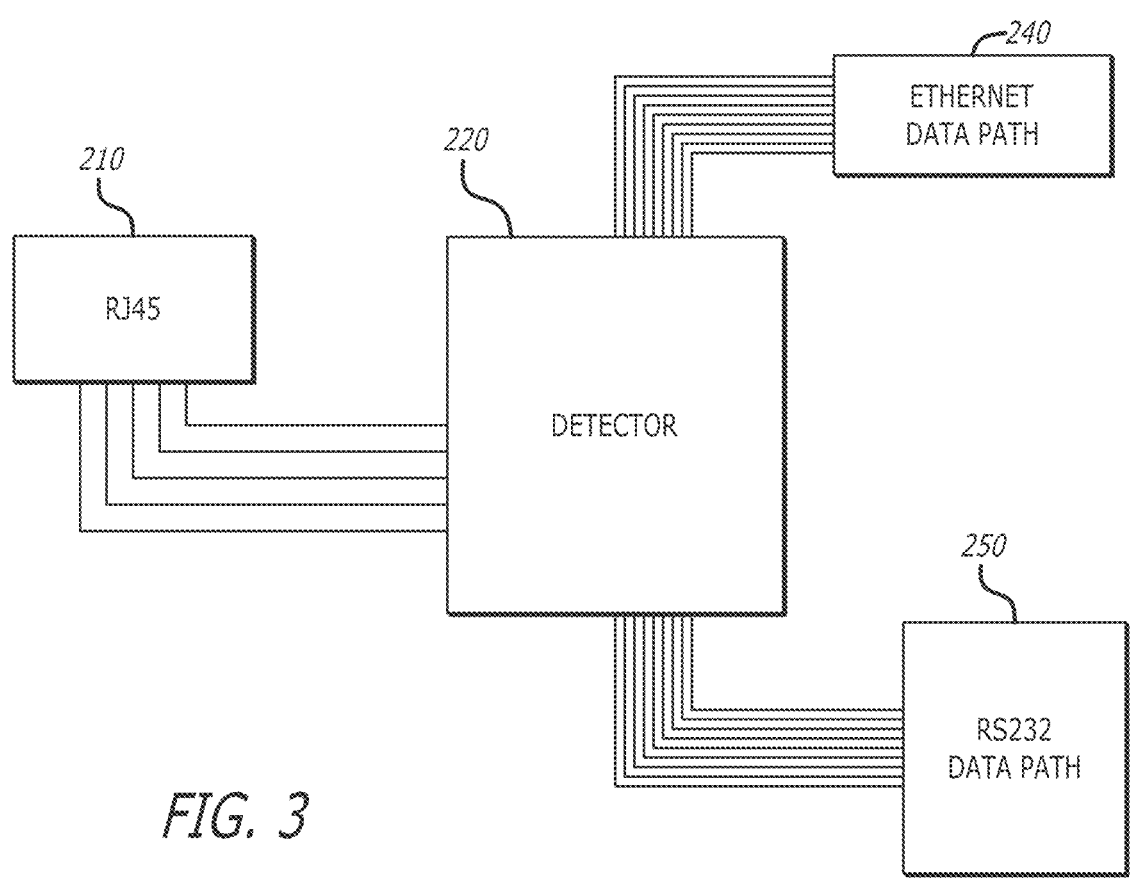
*FIG. 3*

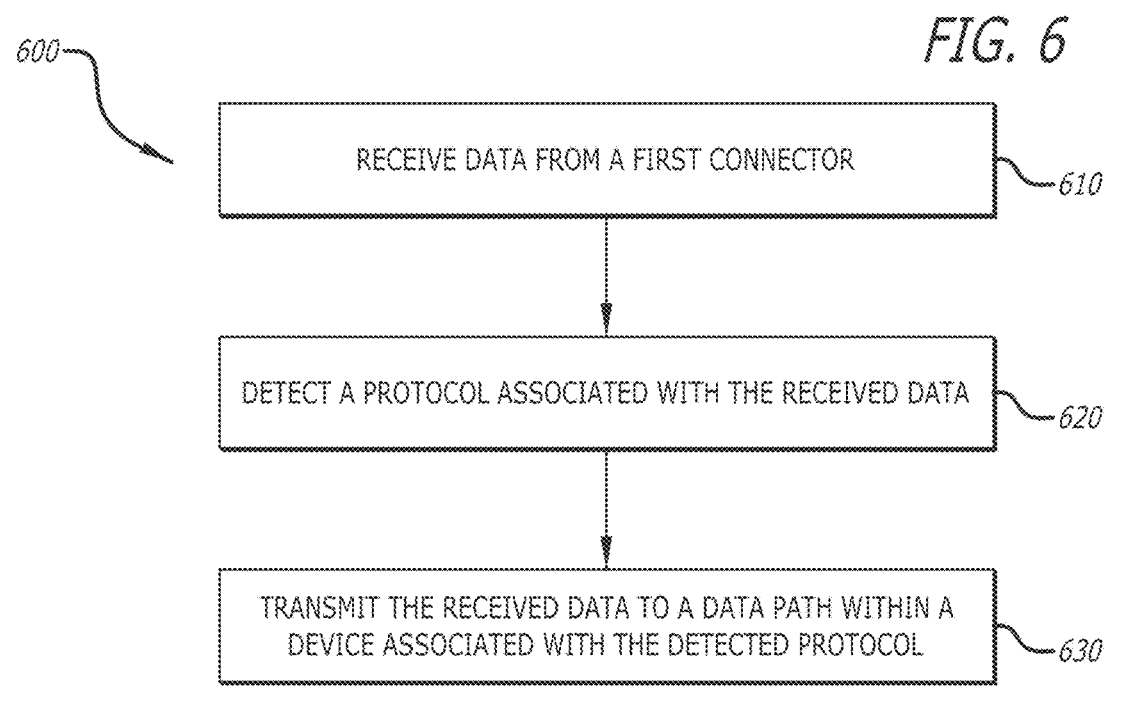

600

RECEIVE DATA FROM A FIRST CONNECTOR — 610

DETECT A PROTOCOL ASSOCIATED WITH THE RECEIVED DATA — 620

TRANSMIT THE RECEIVED DATA TO A DATA PATH WITHIN A DEVICE ASSOCIATED WITH THE DETECTED PROTOCOL — 630

*FIG. 7*

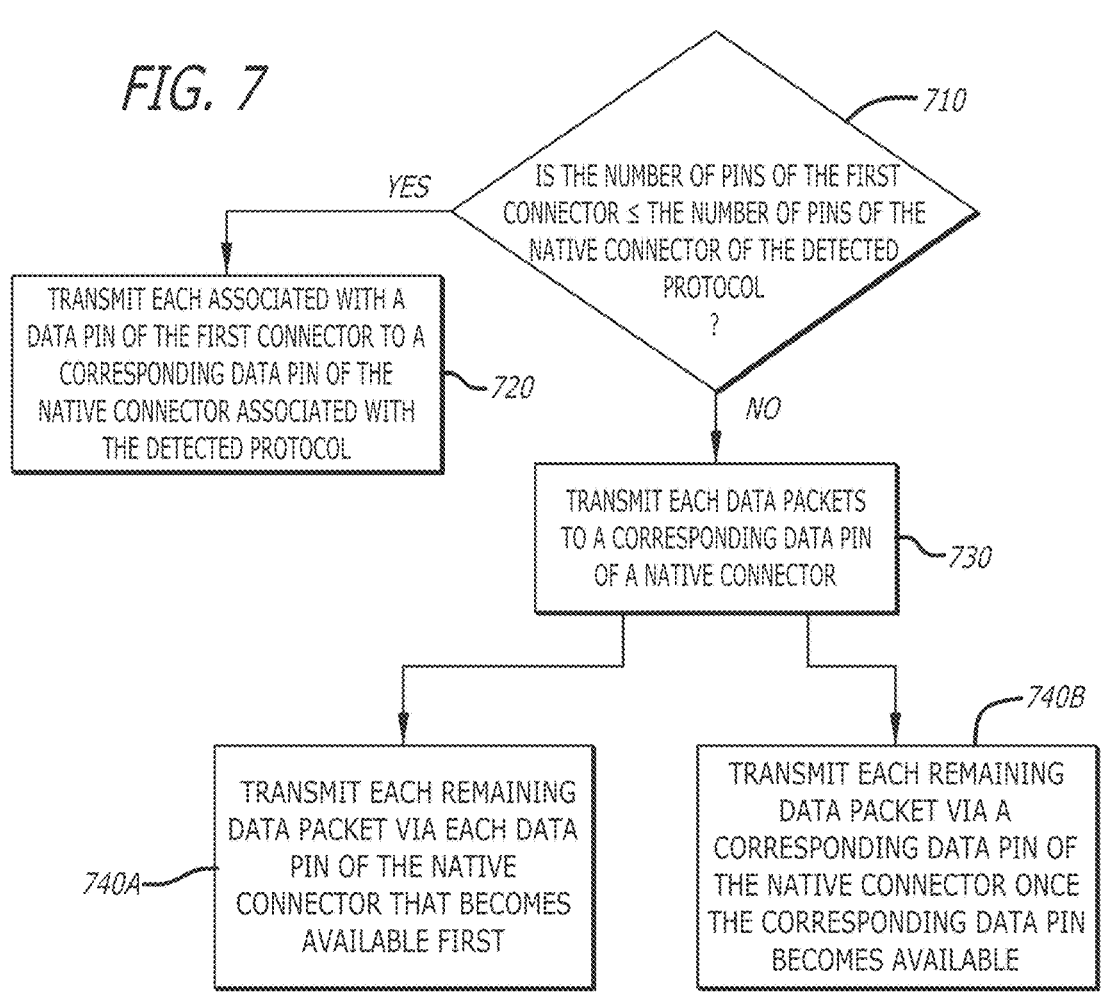

710

IS THE NUMBER OF PINS OF THE FIRST CONNECTOR ≤ THE NUMBER OF PINS OF THE NATIVE CONNECTOR OF THE DETECTED PROTOCOL ?

YES

TRANSMIT EACH ASSOCIATED WITH A DATA PIN OF THE FIRST CONNECTOR TO A CORRESPONDING DATA PIN OF THE NATIVE CONNECTOR ASSOCIATED WITH THE DETECTED PROTOCOL — 720

NO

TRANSMIT EACH DATA PACKETS TO A CORRESPONDING DATA PIN OF A NATIVE CONNECTOR — 730

740A — TRANSMIT EACH REMAINING DATA PACKET VIA EACH DATA PIN OF THE NATIVE CONNECTOR THAT BECOMES AVAILABLE FIRST

740B — TRANSMIT EACH REMAINING DATA PACKET VIA A CORRESPONDING DATA PIN OF THE NATIVE CONNECTOR ONCE THE CORRESPONDING DATA PIN BECOMES AVAILABLE

DATA PROTOCOL DETECTION AND SWITCHING OF MULTI-PROTOCOL DATA ON COMMON CONNECTORS

PRIORITY

This application claims the benefit of and priority to PCT Patent Application No. PCT/US2022/079955 filed on Nov. 16, 2022 and U.S. Provisional Application No. 63/279,899, filed Nov. 16, 2021, which is incorporated in its entirety herein.

FIELD

The present disclosure relates to data transmission. More particularly, the present disclosure relates to detecting and switching data protocol in a multi-protocol data on common connectors.

BACKGROUND

Data transmission or data communication is the transfer and reception of data between a transmitter and a receiver. Generally, the data is a digital bitstream or a digitized analog signal, and the data transmission can take place over a point-to-point or point-to-multipoint communication channel. The data are represented as an electromagnetic signal, such as an electrical voltage, radiowave, microwave, or infrared signal.

Transmission media are essential components to form a communication network, as they are the physical paths between a transmitter and a receiver. In network communications, a transmission medium is a physical connection or an interface between the transmitter and the receiver. There are two major categories of transmission media, namely guided and wireless (or unguided). Amongst the guided transmission media are the twisted pair cables, coaxial cables, and fiber optics. Data transmitted may be digital data originating from a data source, for example a computer or a keyboard. Alternatively, the data may be an analog signal such as a phone call or a video signal, digitized into a bit-stream by using any suitable scheme.

An out of band transmitter, such as a remote access server, may transmit data to various receivers. For example, the server may transmit data to other servers, mobile devices or desktop PCs. While some of the receivers may include network physical interfaces, other receivers may include serial physical interfaces. As such, the server has to be able to transmit the data to two types of physical interfaces: a network physical interface and a serial physical interface.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 2 is a schematic block diagram of a host-computing device with a common connector suitable for data protocol detection and switching, in accordance with an embodiment of the disclosure;

FIG. 3 is a conceptual schematic diagram of a host-computing device with a detector to detect and switch the data protocol, in accordance with an embodiment of the disclosure;

FIG. 4 is a conceptual schematic diagram of a detector to detect and switch the data protocol, in accordance with an embodiment of the disclosure;

FIGS. 5A-B are conceptual illustrations of a detector to detect and switch the data protocol, in accordance with various embodiments of the disclosure;

FIG. 6 is a flowchart depicting a method for detecting and switching the data protocol, in accordance with an embodiment of the disclosure; and FIG. 7 is a flowchart depicting a method for detecting and switching the data protocol, in accordance with an embodiment of the disclosure.

Figure 1:
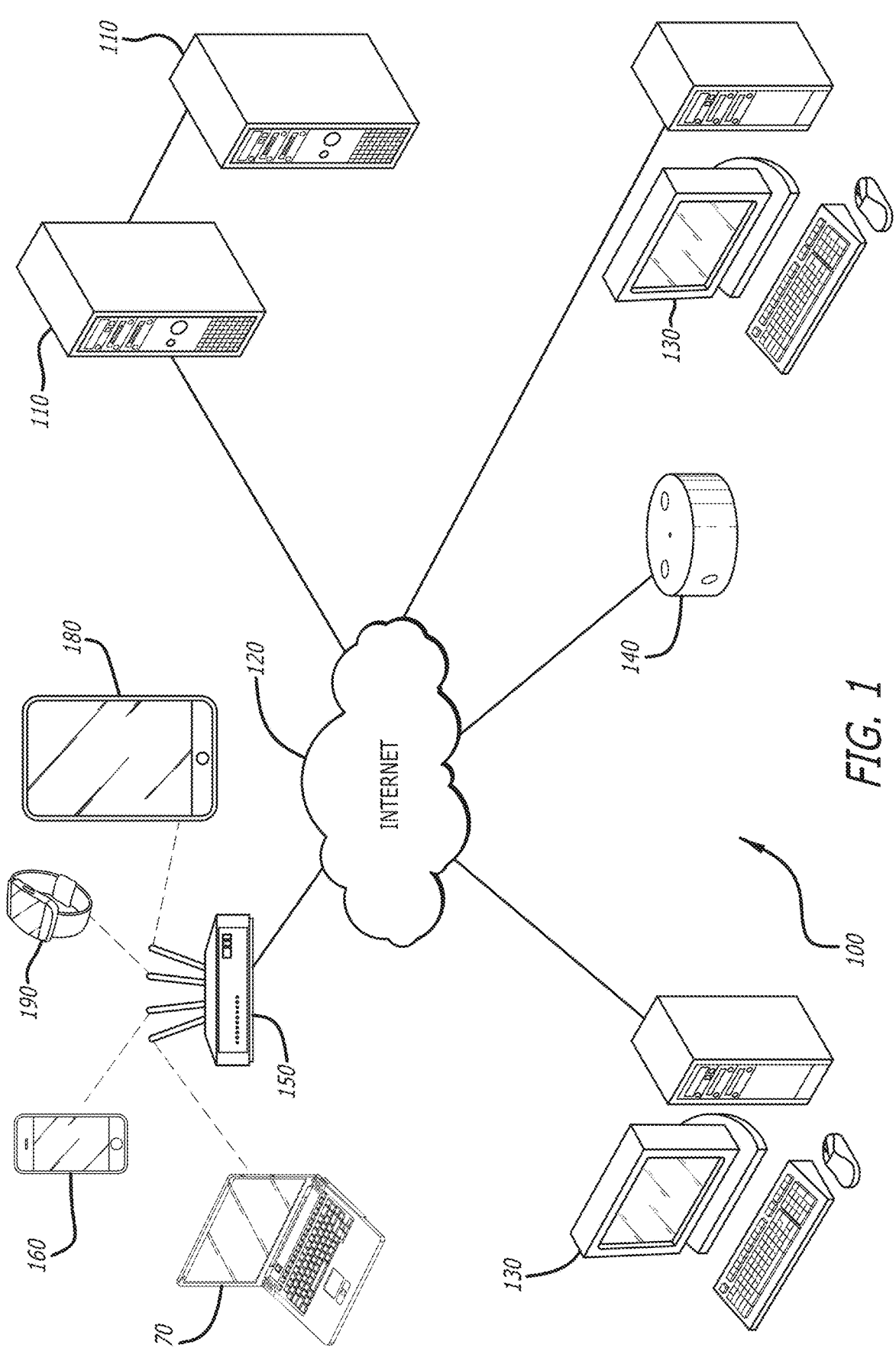
FIG. 1 is a schematic system diagram of a communication network including a host-computing device with a common connector suitable for data protocol detecting and switching, in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the situations described above, devices and methods are discussed herein that detect and switch the data protocol of multi-protocol data on common connectors. While connectors are necessary for transmitting data between devices in communication networks, there is no universal connector. Utilizing a common connector capable of transmitting different types of data protocols can save space and energy. Described herein is a device that employs a common connector and a detector that detects the data protocol, based on which selects a proper data path to transmit the data. Therefore, disclosed device can be smaller in volume and eliminates the use of multiple connectors by substituting different connectors through a single common connector.

The device described herein can further be utilized as an out of band transmitter, such as a remote access server, to transmit data to different receivers, such as other servers, mobile devices, laptops, or desktop PCs.

According to various embodiments of the present disclosure, data transmitted from the common connector passes through a detector logic of a detector that detects a protocol associated with the data. The detected protocol is used to determine the proper data path to transmit the data. Depending on the number of pins of the common connector and the native connector of the device, several method are employed to transmit the data to ensure the data is transmitted via the proper data path.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic system diagram of a communication network 100 including a host-computing device 110 with a common connector suitable for data protocol detecting and switching, in accordance with an embodiment of the disclosure is shown. The communication network 100 may include plurality of client devices 130, 140, 150, 160, 170, 180, 190 in communication with the host-computing device 110. It should be noted that each of the plurality of client devices 130, 140, 150, 160, 170, 180, 190 in communication with the host-computing device 110 may be customer networks, personal devices, screens, or any other devices capable of communicating with the host-computing device 110. The network 100 as shown can encompass any type of network including, but not limited to, intranet and Internet 120 connection networks. As such, a variety of servers may be encompassed by a variety of customer networks 130, 140, 150, 160, 170, 180, 190 that are configured to connect to the host-computing device 110, which may then be connected to other servers or networks.

The communication network 100 may include one or more storage devices of a storage system within the host-computing device 110 in communication via a controller. The host-computing device 110 may include a processor, volatile and/or non-volatile memory, and one or more communication interfaces. The processor which is communicatively coupled to storage device may include one or more central processing units, one or more general-purpose processors, one or more application-specific processors, one or more virtual processors (e.g., the host-computing device 110 may be a virtual machine operating within a host), one or more processor cores, or the like. The one or more communication interfaces may include one or more network interfaces configured to communicatively couple the host-computing device 110 and/or controller of the storage device to a communication network such as an Internet Protocol (IP) network, a Storage Area Network (SAN), wireless network, wired network, or the like.

In many embodiments, the host-computing device 110 may include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients that may utilize the storage system to store and access data.

The one or more communication interfaces may include one or more network interfaces configured to communicatively couple the host-computing device 110 and/or the controller to a network and/or to one or more of the plurality of client devices 130, 140, 150, 160, 170, 180, 190 in communication with the host-computing device 110.

Referring to FIG. 2, a schematic block diagram of a host-computing device with a common connector suitable for data protocol detection and switching, in accordance with an embodiment of the disclosure is shown. In various embodiments, the host-computing device may include a common connector 210 which can transmit the data to the client device receiving the data via a detector 220. In order to transmit data between a host-computing device and a client device in communication with the host-computing device, i.e., transmission of data over physical medium, the host-computing device may need to include a physical interface/connector. The physical interface may be part of the physical layer which defines the means of transmitting a stream of raw bits over a physical data link connecting network nodes, i.e., the host-computing device and each of the plurality of client devices. To that end, the raw bits, i.e., bitstream, may be grouped into code words or symbols and converted to a physical signal that is transmitted over a transmission medium. The physical layer may provide an electrical, mechanical, and procedural interface to the transmission medium. Shapes and properties of the connectors, the frequencies to broadcast on, and the line code to use and similar low-level parameters, may be specified by the physical layer. In some embodiments, the common connector 210 may be an RJ45 connector. The RJ45 is a standardized physical network interface for connecting telecommunications or data equipment. The common connector 210 may include one or more pins through which the data is transmitted. While the described common connector 210 is RJ45, it should be noted that any other suitable connector can be used as the common connector 210.

The host-computing device may transmit the data in various ways. In some embodiments, the host-computing device can transmit the data via a parallel transmission. The parallel transmission is the simultaneous transmission of the signal elements of a character or other entity of data. In some embodiments, parallel transmission is the simultaneous transmission of related signal elements over two or more separate paths. In such embodiments, multiple electrical wires may be used which can transmit multiple bits simultaneously, which in turn may allow for higher data transfer rates than can be achieved with serial transmission.

In some embodiments, the host-computing device may transmit the data via a serial transmission. Serial transmission is the sequential transmission of signal elements of a group representing a character or other entity of data. Digital serial transmissions are bits transmitted over a single wire, frequency or optical path sequentially. Since the serial transmission may require less signal processing and less chances for error than parallel transmission, the transfer rate of each individual path may be faster. Thus, serial transmission can be used over longer distances as a check digit or parity bit can be sent along the serial transmission.

The client devices may use different communication protocols to transmit data via different connectors. For example, while a client device may include an Ethernet connector, another client device may include a serial connector. As such, the common connector 210 may include two data path, i.e., an Ethernet data path 240 and a serial data path 250, within the host-computing device and may be capable of transmitting the data via both a parallel transmission, e.g., via the Ethernet data path 240, and a serial transmission, e.g., via the serial data path 250. To that end, a detector 220 may receive the data transmitted via the common connector 210 prior to being transmitted to the client devices. The detector 220 may include a detector logic 225 which can detect the protocol associated with the data being transmitted. Once the detector logic 225 detects the protocol, the detector 220 may determine which data path should be used to transmit the data. If the protocol associated with the data is determined to be an Ethernet protocol, then the detector 220 may direct the processor to switch the circuit 230 so that the data is transmitted via the Ethernet data path 240. Similarly, if the protocol associated with the data is determined to be a serial protocol, then the detector 220 may direct the processor to switch the circuit 230 so that the data is transmitted via the serial data path 250. While in some embodiments, the serial data path 250 may include an RS232 connector, the serial data path 250 may include any other suitable serial connector. In some embodiments, the common connector may be an RJ45 connector and the detected protocol may be an Ethernet protocol. Alternatively, in some embodiments, the common connector may be an RS232 connector and the detected protocol may be a serial-type protocol.

Referring to FIG. 3, a conceptual schematic diagram of a host-computing device with a detector to detect and switch the data protocol, in accordance with an embodiment of the disclosure is shown. Each data path from the detector 220, i.e., the Ethernet data path 240 and the serial data path 250, may include a plurality of data transmission channels. The plurality of data transmission channels may correspond to one or more data pins of a native connector associated with the detected protocol of the data being transmitted. Depending on the protocol associated with the data being transmitted, the number of one or more data pins of the native connector associated with the detected protocol of the data being transmitted may differ. As a non-limiting example, while the common connector may include an 8-pin connector, the native connector associated with the detected protocol of the data being transmitted may include a 7-pin connector. It should be noted that, the common connector and the native connector associated with the detected protocol of the data being transmitted may include the same number of pins. In some embodiments, the common connector and the native connector associated with the detected protocol of the data being transmitted may be similar types of connectors. In some embodiments, common connector 210 may be an RJ45 connector and the detected protocol may be an Ethernet protocol.

Figures 4, 5A, 5B:
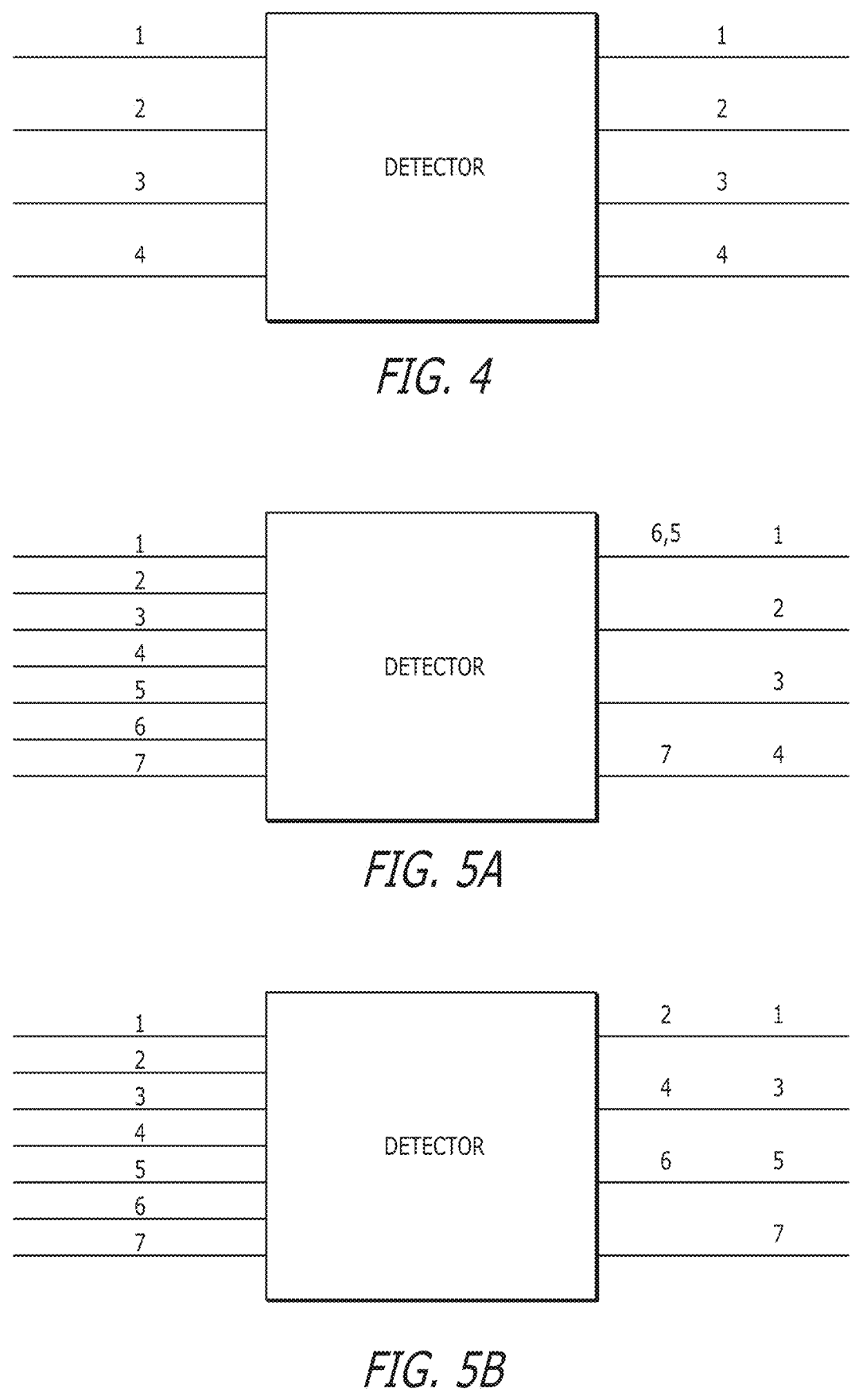

Referring to FIG. 4, a conceptual schematic diagram of a detector to detect and switch the data protocol, in accordance with an embodiment of the disclosure is shown. In some embodiments, the detector may determine that the number of data pins of the common connector may be less than or equal to the number of data pins associated with the native connector of the detected protocol. In such embodiments, the detector may direct the processor to switch the circuit so that each data packet of the data may be received via a certain data pin of the common connector is transmitted to a corresponding data pin of the native connector associated with the detected protocol. As a non-limiting example, the detector determines that both the common connector and the native connector of the detected protocol include 4 pins. The detector then may direct the processor to transmit each received data packet from each pin of the common connector via the corresponding pin of the native connector of the detected protocol, i.e., data packets received from pins 1, 2, 3, 4, of the common connector being transmitted via the pins 1, 2, 3, 4 of the native connector of the detected protocol, respectively.

Referring to FIGS. 5A-B, conceptual illustrations of a detector to detect and switch the data protocol, in accordance with various embodiments of the disclosure are shown. In some embodiments, the number of data pins of the common connector may be higher than the number of data pins associated with the native connector of the detected protocol. In such embodiments, the host-computing device may include a manipulation-transmission logic. The manipulation-transmission logic may be configured to direct the processor to change the order of transmitting the received data packets, so every data packet is transmitted via the proper data path, i.e., the Ethernet data path or the serial data path. Once the manipulation-transmitting logic determines that the number of data pins of the common connector may be higher than a number of data pins associated with the native connector of the detected protocol, the manipulation-transmission logic may direct the processor to transmit the received data by a pre-defined manipulation method.

Referring now to FIG. 5A, the manipulation-transmission logic may direct the processor to transmit each data packet of the received data associated with a data pin of the common connector to the corresponding data pin of the native connector associated with the detected protocol. Subsequently, the manipulation-transmission logic may direct the processor to transmit each remaining data packet of the received data via each data pin of the native connector associated with the detected protocol that may become available first. As a non-limiting example, when the common connector includes 7 pins and the native connector associated with the detected protocol includes 4 pins, the manipulation-transmission logic directs the processor to transmit the data packets received from the pins 1, 2, 3, 4 of the common connector via the pins 1, 2, 3, 4 of the native connector associated with the detected protocol first, respectively. The manipulation-transmission logic then may detect which pin(s) of the native connector associated with the detected protocol may become available, and may direct the processor to transmit the remaining data packets received from the pins of the common connector via the available pin(s) in order the pins become available. As a non-limiting example, once the first 4 data packets are transmitted via the pins 1, 2, 3, 4 of the native connector associated with the detected protocol, the manipulation-transmission logic detects that pin 1 of the native connector is available and directs the processor to transmit the data packet received from the pin 5 of the common connector via the pin 1 of the native connector associated with the detected protocol. Similarly, once the same pin 1 of the native connector associated with the detected protocol becomes available again, then the manipulation-transmission logic directs the processor to transmit the data packet received from the pin 6 of the common connector via the pin 1 of the native connector associated with the detected protocol. Lastly, once the manipulation-transmission logic detects that the pin 4 of the native connector may be available, the manipulation-transmission logic directs the processor to transmit the data packet received from the pin 7 of the common connector via the pin 4 of the native connector associated with the detected protocol.

Referring now to FIG. 5B, the manipulation-transmission logic may direct the processor to transmit each data packet of the received data associated with a data pin of the common connector to the corresponding data pin of the native connector associated with the detected protocol. Subsequently, the manipulation-transmission logic may direct the processor to transmit each remaining data packet of the received data via the corresponding data pin of the native connector associated with the detected protocol, once the corresponding data pin may become available. As a non-limiting example, when the common connector includes 7 pins and the native connector associated with the detected protocol includes 4 pins, the manipulation-transmission logic directs the processor to transmit the data packets received from the pins 1, 2, 3, 4 of the common connector via the pins 1, 2, 3, 4 of the native connector associated with the detected protocol first. The manipulation-transmission logic further may determine that the data packets 1 and 2, data packets 3 and 4, data packets 5 and 6, and data packet 7 souled be transmitted via the same pin of the native connector associated with the detected protocol. The manipulation-transmission logic directs the processor to transmit the data packets received from the pins 1, 3, 5 and 7 of the common connector via separate pins of the native connector associated with the detected protocol first. Once each of the pins of the native connector associated with the detected protocol becomes available, the manipulation-transmission logic may direct the processor to transmit each remaining data packet via the corresponding pin of the native connector associated with the detected protocol.

In some embodiments, each data packet received from the common connector may be pre-labeled with the protocol associated with the data packet. That is, in some embodiments, the manipulation-transmission logic may be configured to direct the processor to transmit the data packets based on a Multiprotocol Label Switching (MPLS) method. In such embodiments, the manipulation-transmission logic may direct the processor to transmit the data packets from the host-computing device to the client device based on the path labels that are assigned to each data packet, without using the network addresses, which avoids lookups in a routing table and speeding traffic flows. The path labels may identify which path should be used to transmit the data packet, i.e., the Ethernet data path or the serial data path.

Referring to FIG. 6, a flowchart depicting a method for detecting and switching the data protocol 600, in accordance with an embodiment of the disclosure is shown. As represented at block 610, the method 600 starts when data may be received from the common connector. The common connector may include one or more data pins to transmit data packets of the data. In various embodiments, the data may be received by a processor which may be communicatively coupled to a memory, and may be directed by a protocol-detecting logic. In some embodiments, each data packet of the received data may be labeled as an Ethernet-type data packet or a Serial-type data packet.

As represented at block 620, the method 600 continues when a protocol associated with the received data may be detected. For instance, the detected protocol associated with the received data may be an Ethernet protocol and a serial-type protocol. The method 600 further continues when the received data may be transmitted to a data path within a device associated with the detected protocol, as represented by block 630. The data path within the device may include a plurality of transmission channels which are configured to correspond to one or more data pins of a native connector associated with the detected protocol. In various embodiments, the data may be transmitted by the processor which may be communicatively coupled to the memory, and may be directed by the protocol-detecting logic.

Referring to FIG. 7, a flowchart depicting a method for detecting and switching the data protocol 700, in accordance with an embodiment of the disclosure is shown. The method 700 starts when the number of data pins of the common connector and the number of pins associated with the native connector of the detected protocol are determined. In some embodiments, the number of pins of the common connector may be less than or equal to the number of data pins associated with the native connector of the detected protocol, as represented at block 710. In such embodiments, each data packet of the received data associated with a data pin of the common connector may be transmitted to a corresponding data pin of the native connector associated with the detected protocol, as represented at block 720.

In some embodiments where the number of pins of the common connector may be more than the number of data pins associated with the native connector of the detected protocol. In some embodiments, the received data may be transmitted by a pre-defined manipulation method, in which each data packet may be transmitted to a corresponding data pin of the native connector, as represented at block 730. In such embodiments, the data may be transmitted in one of the following ways.

As represented at block 740A, in some embodiments, each remaining data packet may be transmitted via each data pin of the native connector that may become available first. Alternatively, as represented at block 740B, each remaining data packet may be transmitted via a corresponding data pin of the native connector once the corresponding data pin may become available. In some embodiments, transmitting the data by the pre-defined manipulation method may be performed by the processor which may be communicatively coupled to the memory, and may be directed by a manipulation-transmitting logic. It should be noted that, while in some embodiments the protocol-detecting logic may be different from the manipulation-transmission logic, in some embodiments the protocol-detecting logic may be the same as the manipulation-transmission logic.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
   a processor; and
   a protocol-detecting logic configured to direct the processor to:
      receive data from a first connector, wherein the first connector comprises one or more data pins;
      detect a protocol associated with the received data; and
      transmit the received data to a native connector associated with the detected protocol, wherein the received data is transmitted according to a pre-defined manipulation method if a quantity of data pins of the first connector is greater than a quantity of data pins of the native connector.

2. The device of claim 1, wherein the received data is transmitted to the native connector via a data path comprising a plurality of data transmission channels.

3. The device of claim 2, wherein the data transmission channels each correspond to one or more data pins of the native connector associated with the detected protocol.

4. The device of claim 3, wherein the received data associated with a data pin of the first connector is transmitted to a corresponding data pin of the native connector associated with the detected protocol if the quantity of data pins of the first connector is less than or equal to the quantity of data pins associated with the native connector of the detected protocol.

5. The device of claim 4, further comprising a manipulation-transmitting logic configured to:
   determine that the quantity of data pins of the first connector is greater than the quantity of data pins associated with the native connector of the detected protocol, and, in response, direct the processor to transmit the received data according to the pre-defined manipulation method; and
   determine that the quantity of data pins of the first connector is less than or equal to the quantity of data pins associated with the native connector of the detected protocol, and, in response, direct the processor to transmit the received data to the corresponding data pin of the native connector associated with the detected protocol.

6. The device of claim 1, wherein the pre-defined manipulation method comprises:
   transmitting each data packet of the received data associated with a data pin of the first connector to a corresponding data pin of the native connector associated with the detected protocol; and
   transmitting each remaining data packet of the received data via each data pin of the native connector associated with the detected protocol that becomes available first.

7. The device of claim 1, wherein the pre-defined manipulation method comprises:
   transmitting each data packet of the received data associated with a data pin of the first connector to a corresponding data pin of the native connector associated with the detected protocol; and
   transmitting each remaining data packet of the received data via a corresponding data pin of the native connector associated with the detected protocol once the corresponding data pin becomes available.

8. The device of claim 1, wherein each data packet of the received data is an Ethernet-type data packet or a serial-type data packet.

9. The device of claim 1, wherein the first connector is an RJ45 connector and the detected protocol is an Ethernet protocol or is a serial-type protocol.

10. A host-computing device comprising the device of claim 1, wherein the host-computing device is configured to communicate with a plurality of client devices via a communication network.

11. A method of transmitting data, the method comprising:
   receiving data from a first connector, wherein the first connector comprises one or more data pins;
   detecting a protocol associated with the received data; and
   transmitting the received data to a native connector associated with the detected protocol, wherein a quantity of data pins of the first connector is greater than a quantity of data pins associated with the native connector, and wherein the received data is transmitted according to a pre-defined manipulation method.

12. The method of claim 11 wherein the received data is transmitted to the native connector via a data path comprising a plurality of data transmission channels.

13. The method of claim 12, wherein the data transmission channels each correspond to one or more data pins of the native connector of the detected protocol.

14. The method of claim 13, wherein each data packet of the received data associated with a data pin of the first connector is transmitted to a corresponding data pin of the native connector associated with the detected protocol if the quantity of data pins of the first connector is less than or equal to the quantity of data pins associated with the native connector of the detected protocol.

15. The method of claim 14, further comprising:
   determining that the quantity of data pins of the first connector is greater than the quantity of data pins associated with the native connector of the detected protocol, and, in response, causing the received data to be transmitted according to the pre-defined manipulation method; and
   determine that the quantity of data pins of the first connector is less than or equal to the quantity of data pins associated with the native connector of the detected protocol, and, in response, causing the received data to be transmitted to the corresponding data pin of the native connector associated with the detected protocol.

16. The method of claim 11, wherein the pre-defined manipulation method comprises:
   transmitting each data packet of the received data associated with a data pin of the first connector to a corresponding data pin of the native connector associated with the detected protocol; and transmitting each remaining data packet of the received data via each data pin of the native connector associated with the detected protocol that becomes available first.

17. The method of claim 11, wherein the pre-defined manipulation method comprises:

transmitting each data packet of the received data associated with a data pin of the first connector to a corresponding data pin of the native connector associated with the detected protocol; and transmitting each remaining data packet of the received data via a corresponding data pin of the native connector associated with the detected protocol once the corresponding data pin becomes available.

18. The method of claim 11, wherein each packet of the received data is an Ethernet-type data packet or a serial-type data packet.

19. The method of claim 11, wherein the data is received and transmitted by a processor which is communicatively coupled to a memory, and is directed by a protocol-detecting logic.

20. The method of claim 11, wherein transmitting the data by the pre-defined manipulation method is performed by a processor which is directed by a manipulation-transmitting logic.

\* \* \* \* \*